Figure 1:
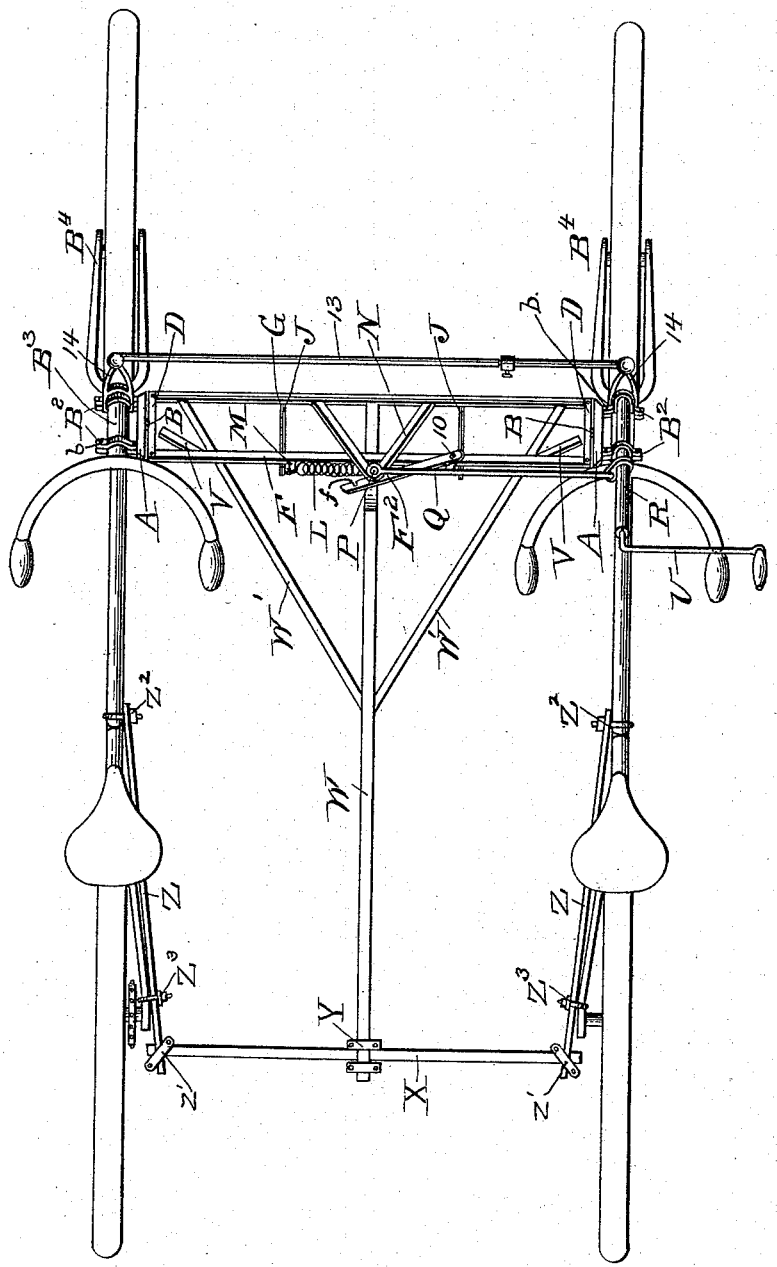

(No Model.) 3 Sheets—Sheet 1.

E. S. KEELER.
BICYCLE OR OTHER VEHICLE COUPLING.

No. 573,469. Patented Dec. 22, 1896.

Witnesses
Jos. H. Blackwood
H. P. Doolittle

Inventor
Elisha S. Keeler
by W. H. Doolittle & Son
Attorneys (No Model.) 3 Sheets—Sheet 2.
E. S. KEELER.
BICYCLE OR OTHER VEHICLE COUPLING.
No. 573,469. Patented Dec. 22, 1896.
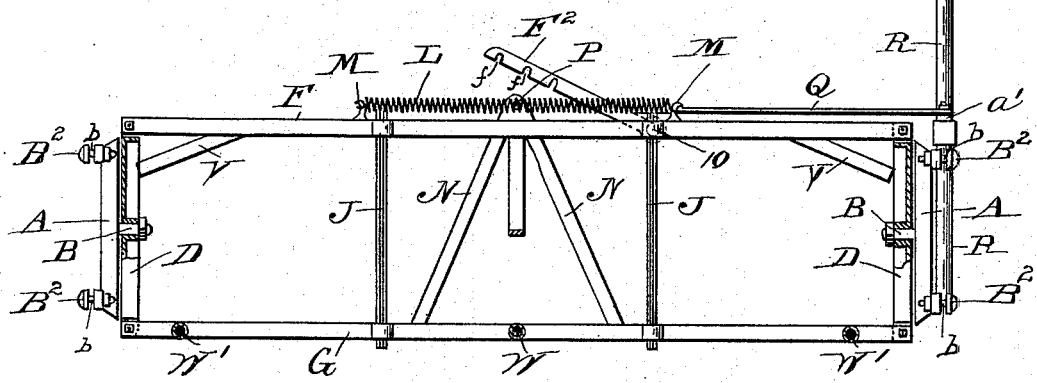
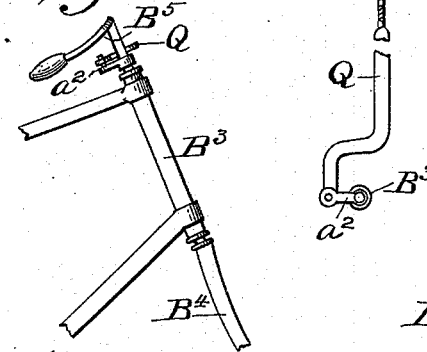
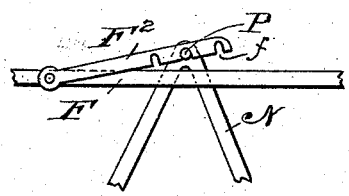
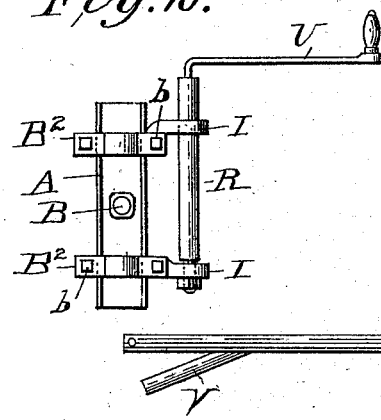
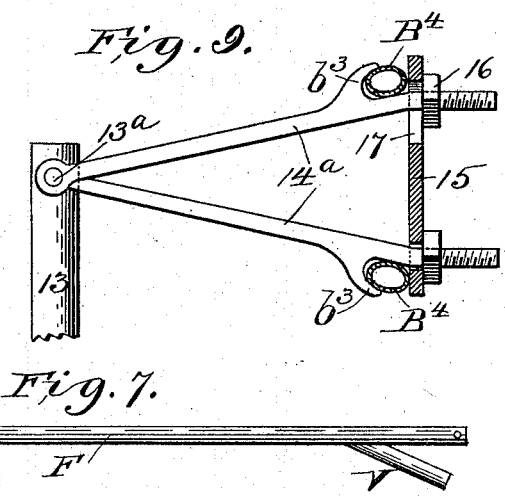
Witnesses
Jos H Blackwood
H P Doolittle
Inventor
Elisha S Keeler
by M H Doolittle & Son
Attorneys

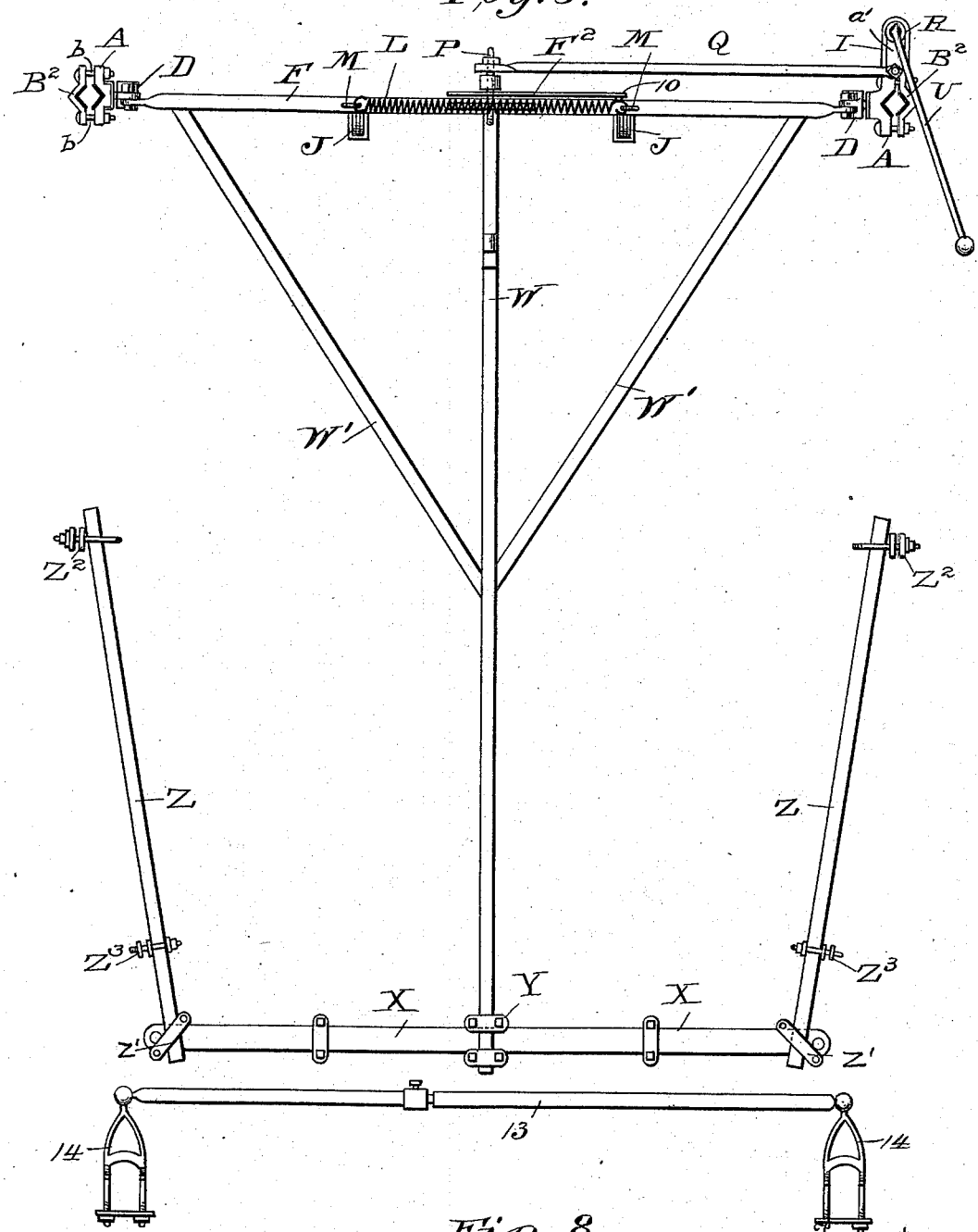

UNITED STATES PATENT OFFICE.

ELISHA S. KEELER, OF NEW ALBANY, PENNSYLVANIA.

BICYCLE OR OTHER VEHICLE COUPLING.

SPECIFICATION forming part of Letters Patent No. 573,469, dated December 22, 1896.

Application filed March 2, 1896. Serial No. 581,557. (No model.)

*To all whom it may concern:*

Be it known that I, ELISHA S. KEELER, a citizen of the United States, residing at New Albany, in the State of Pennsylvania, have invented certain new and useful Improvements in Bicycle or other Vehicle Couplings; and I do hereby declare the following to be a full, clear, and exact description of the invention, such as will enable others skilled in the art to which it appertains to make and use the same.

My invention relates to certain improvements, as hereinafter claimed, mainly applicable to means for coupling bicycles, but which may also be used in connection with other wheeled vehicles, such as trotting-sulkies.

The chief object of my invention is to provide means for coupling two bicycles in such manner that they will practically constitute a single four-wheeled vehicle, this coupling being adapted to either rigidly connect the two bicycles and maintain them in upright positions or yieldingly connect them, so that they may turn short curves and ride over obstructions and uneven surfaces without twisting or straining either the coupler or the bicycles connected thereby.

In the accompanying drawings, showing a suitable embodiment of my improvements, Figure 1 is a plan or top view of two bicycles united by my improved coupler. Fig. 2 is a view in rear elevation of the main or front supporting-frame of the coupler detached, some parts being shown in section. Fig. 3 is a plan or top view of the entire coupler detached. Fig. 4 is a view in side elevation of the steering-head of a bicycle, showing a modification of the controlling-lever of the coupler. Fig. 5 is a top or plan view of a portion of the connecting-rod of the controlling-lever of the modification shown in Fig. 4. Fig. 6 is a detail view, in front elevation, of a portion of the main or front supporting-frame of the coupler and the locking-latch for holding the frame rigid. Fig. 7 is a view in elevation of the top bar of the front supporting-frame detached, showing the stops for limiting the rocking movements of the frame. Fig. 8 is a top or plan view of the steering mechanism. Fig. 9 is an enlarged top or plan view, partly in section, of a modified means employed for connecting the steering-rod to the bicycles. Fig. 10 is an end view of one of the side bars of the front supporting-frame, showing the preferred manner of mounting the controlling-lever.

The coupler may be said to consist of two parts, the front or main supporting-frame and the rear or auxiliary supporting and equalizing frame. The front or main supporting-frame is composed of the parallel cross-bars F and G, having pivotal connection at their opposite ends with vertical end bars D D, which have suitable connection, as by the pivots B B, with attaching-plates A A. These attaching-plates A A are adapted to be detachably connected, respectively, with the steering-heads $B^3 B^3$ of two bicycles which are to be united by the coupler. Any suitable means may be employed for detachably connecting the attaching-plates to the bicycles, the means shown in the drawings consisting of the divided clamps $B^2 B^2$, which are adapted to embrace the bicycle steering-heads and be firmly clamped thereon by means of clamp-bolts $b$, as will be understood. It will be seen that by this construction two bicycles of any well-known or suitable style, size, or construction may be readily and quickly coupled and uncoupled, and that the pivotal construction of the coupling-frame will permit the bicycles to be inclined together laterally and moved vertically independently of each other, the former movement being permitted by the frame rocking or vibrating laterally about the pivotal connections between the upper and lower parallel bars and the vertical end bars, and the latter movement being permitted partly by this lateral rocking movement of the frame and partly by the attaching-plates swiveling about their pivotal connections with the vertical end bars. In operation this swiveling movement of the attaching-plates is but slight, as the pivotal connections of the upper and lower parallel bars and the end bars are almost sufficient to provide all necessary movement of the frame. In fact, in some instances this swiveling connection may be omitted, if desired.

The front supporting-frame is yieldingly maintained in its normal upright position and returned to such position after having been moved therefrom by the inclining of the bicycles by means of two plate-springs J J, one end of each spring being rigidly connected to, say, the upper bar F of the frame, while the other ends of the springs have a free or sliding connection with the other or lower bar G of the frame.

The action of the plate-springs J J is supplemented by the coiled spring L, which is detachably connected at its opposite ends to the upper bar F of the frame by hooks M M, rigid with said bar. This coiled spring is also adapted to be detachably connected at a point midway its length to the upper end of a preferably triangular brace-piece N N, which is rigidly connected to the lower parallel bar G and projects upwardly therefrom slightly above the upper parallel bar F, this connection being made by way of a fixed projection P on the brace-piece and adapted to be detachably engaged by the coiled spring.

The rocking movement of the front supporting-frame, permitted by the pivotal connections between the upper and lower parallel bars and the end bars, as before explained, is limited in opposite directions by means of short arms or stops V V, projecting downwardly from the under side of the upper arm F of the frame near the opposite ends thereof and adapted to come in contact with the end bars D D.

The coupler-frame so far described is a flexible one and yieldingly holds the bicycles in their normal upright positions while freely allowing them the movements before described.

In order to provide means for holding the coupling-frame practically rigid when desired, as, for instance, when the bicycles are being used by beginners, or persons learning to ride, I employ locking mechanism as follows: A latch $F^2$ is pivoted at 10 to the upper frame-bar F and is provided with notches $f$ for engaging the pin P on the brace-piece N N. The pivoted latch is shown as having three such notches $f$ for rigidly holding the coupler-frame in either of three positions, namely, in its normal central position and in positions on opposite sides of the central position. A greater number of notches may be provided, if desired. The pivoted latch may be turned back into inoperative position alongside of the upper frame-bar F out of the way when it is not desired to use it, or, if preferred, it may be entirely removed from the coupler. The coiled spring L may likewise be rendered inoperative by disengaging it from connection with the upper end of the brace-piece N N or it may be entirely removed from the coupler, thus allowing the coupler greater elasticity and flexibility, as may be desired by expert riders.

The vertical plate-springs J J and the coiled spring L are employed for the purpose of giving the coupler-frame the proper rigidity, return it to and hold it in its normal upright position, and in connection with spring X of the rear or auxiliary supporting and equalizing frame, hereinafter described, impart an equalizing tension to the coupler-frame. Obviously these objects may be attained by employing but one or two of the above-mentioned springs and increasing the size and strength of the spring or springs so employed, as may be necessary.

As a means for positively controlling the rocking movements of the coupler-frame I have provided the following controlling mechanism: A controlling rock-shaft R (see Figs. 1, 2, 3, and 10) is supported by and has bearing in suitable bracket-like bearings projecting forwardly from one of the attaching plates A A, (preferably that one at the right-hand end of the coupler,) and rigidly projecting from this rock-shaft is a lever $a'$. A link-rod Q connects the lever $a'$ with the brace-piece N N by way of the projection P, so that when the lever $a'$ is rocked in one direction or the other by the turning of the controlling rock-shaft R the brace-piece N N is moved either to the right or left, and consequently the coupler and the bicycles connected thereby are caused to rock or tilt in the desired direction. Desired turning movement is imparted to the controlling rock-shaft R by means of the crank-handle U, which has suitable detachable connection with the controlling rock-shaft.

The controlling mechanism is chiefly intended for the use of beginners, who may thereby have the movements of the bicycle completely under their control. By its use the bicycles may be held in upright position or they may be inclined either to the right or to the left and held in such adjusted positions for the purpose of turning curves, &c., and when the controlling-lever is released the tendency of the coupler-springs is to return the bicycles to their normal upright position, as above explained. When the coupled bicycles are used by experts, the detachable controlling crank-handle may be removed. Instead of employing the controlling rock-shaft R and crank-handle U, just described, the controlling link-rod Q may be attached to a lever $a^2$, rigidly connected to the steering-post of one of the two bicycles. In this instance the movements of the coupler-frame are under the control of the handle-bars of the bicycles. This modified controlling mechanism is shown in Figs. 4 and 5.

The rear or auxiliary supporting and equalizing frame of the coupler is preferably constructed as follows: A main or central connecting-rod W, arranged centrally and longitudinally of the coupler, is rigidly attached at its front end to the center of the lower parallel bar G of the main frame of the coupler, and side brace-bars W' W', connected to said cross-bar G near its opposite ends and to the connecting-rod W at or near its center, serve to brace and support the coupler. Connected to the rear end of the main connecting-rod W by clamps Y Y is an equalizing plate-spring X, extending at right angles to the connecting-rod W. The spring X is attached at its opposite ends to side connecting-bars Z Z by means of suitable straps or clamps Z' Z', and the side connecting-bars are adapted to be detachably connected in suitable way to the rear frames of the bicycles united by the coupler. As shown, the side connecting-bars are detachably connected at their front ends to the respective bicycle-frames by means of clips $Z^2 Z^2$, and are also connected at or near their rear ends to the rear wheel-frames of the bicycles by means of the clips or straps $Z^3 Z^3$, of well-known construction, and which allow the side connecting-bars a slight play in them.

The equalizing-spring X, it will be seen, assists in keeping the coupler in an upright position, but, if desired, this spring could be made of such strength and tension as to give the coupler the proper rigidity without either the springs J J or L of the front supporting-frame, as above explained. I, however, prefer to use the springs of the front supporting-frame as well as the spring X in order to properly distribute and equalize the strain to which the coupler is subjected. The spring X also serves to keep the rear wheels of the bicycles the proper distance apart. Obviously the spring X could be modified more or less, as, for instance, by substituting a stiff bar having springs attached to its opposite ends.

To provide for the proper guiding or steering of the front wheels of the bicycles united by my improved coupler, I have devised a steering apparatus such as next to be described. A steering-rod 13, made of telescopic sections which may be lengthened or shortened and firmly clamped together by a set-screw, as will readily be understood, is pivotally connected at its opposite ends to two bracket-like forked supporting-clamps 14 14. (See Figs. 1 and 8.) These clamps are adapted to be detachably and rigidly secured in any suitable well-known way, as by the clamp pieces and nuts shown in the drawings, to the steering-posts of the bicycles connected by the coupler, as before described, and project forward therefrom, so that the pivotal connections of the steering-rod and the supporting-clamps are directly over the center of the front wheels of the bicycles.

In Fig. 9 I have shown a modified form of supporting-clamp for detachably connecting the steering-rod to the frames of the bicycles, the modified supporting-clamps being adjustable. As shown, these modified supporting-clamps each consist of two arms or members $14^a$, pivoted at $13^a$ to the end of the steering-rod 13, and these arms or members are provided near their inner ends with curved or hook-shaped projections $b^3$, adapted to engage the front surfaces of the forks of the steering-heads of the bicycles at points above the tops of the front wheels supported by said forks. The rear ends of the arms $14^a$ are screw-threaded and are adapted to pass through a slotted clamp-plate 15, which bears upon the rear sides of the bicycle-forks. The bicycle-forks are thus embraced on opposite sides by the hooks $b^3$ and the clamp-plate 15, which may be tightly clamped against the forks for securely holding the supporting-clamps in place upon the steering-head by means of clamp-nuts 16 on the threaded ends of the arms $14^a$. One of the slots 17 of the clamping-plate is elongated, so that the supporting-clamps may be adjusted to suit bicycle-frames of different sizes.

It will be seen that the steering-bar, while being so pivoted as to conform to the various movements of the coupler, at the same time serves to maintain the front wheels of the bicycles in the same relative positions as to direction, or guide them simultaneously, so that when one wheel is turned or guided to the right or left, in steering the bicycles united by the coupler, the other wheel will be turned or guided correspondingly, and that by locating the pivotal connections of the steering-bar and its supporting-clamps over the front wheels of the bicycles the steering-bar is entirely free from all binding action and does not interfere with the movements of the bicycle-wheels.

It will be understood from the above description that two bicycles of any well-known or suitable style, size, or construction may readily and quickly be coupled and uncoupled by my improved coupler in such a way that when coupled they will constitute a single four-wheel vehicle; that when forward movement is imparted to one or both of the bicycles so coupled they are compelled to move forward in unison; that the jointed flexible construction of the coupler permits the bicycles to be freely inclined together laterally when making sharp or other curves, and also permits them to move vertically independently of each other when either or both of the bicycles are passing over obstructions or uneven surfaces, and that these various movements are made without straining or twisting of either the coupler or the bicycles connected thereby. It will further be understood that for the use of timid persons or persons learning to ride the coupler may be locked so as to keep the bicycles rigidly in their upright or other desired positions, and that the lateral movements of the coupler and the bicycles connected by it may be controlled either by the positions of the rider or riders or positively by the controlling mechanism.

While I have shown and described my improvements as applied to a coupler for connecting bicycles, I do not wish to be understood as confining my invention to such a coupler, as the improvements as a whole or some of them separately may be used for other purposes. For instance, instead of using the detachable coupler as hereinbefore described, the coupler may be permanently applied to a four-wheel vehicle which will have all the movements before explained; or some of my improvements may be applied to two-wheel vehicles, such as trotting-sulkies.

I claim as my invention—

1. In a bicycle-coupler, the combination of the flexible coupler-frame comprising the upper and lower parallel cross-bars, the vertical end bars pivotally connected to the upper and lower parallel bars, means for attaching the end bars to the frames of two bicycles, and means for yieldingly maintaining the coupler-frame in its normal upright position, substantially as and for the purpose set forth.

2. In a bicycle-coupler, the combination of the coupler-frame comprising the upper and lower parallel bars, the vertical end bars pivotally connected to the upper and lower parallel bars, the attaching-plates pivotally connected to the end bars, means for detachably securing the attaching-plates to the frames of two bicycles, and means for yieldingly maintaining the coupler-frame in its normal upright position, substantially as described.

3. The combination of the flexible coupler-frame comprising the upper and lower parallel bars, the vertical end bars pivotally connected to the upper and lower parallel bars, the attaching-plates, and the springs connecting the upper and lower parallel bars for yieldingly maintaining the coupler-frame in its normal upright position, substantially as set forth.

4. The combination of the coupler-frame comprising the upper and lower parallel bars, the vertical end bars pivotally connected to the upper and lower parallel bars, means for yieldingly maintaining the coupler-frame in its normal upright position, and means for rigidly locking the coupler-frame in any desired fixed position, substantially as set forth.

5. The combination of the coupler-frame comprising the upper and lower parallel bars, the vertical end bars pivotally connected to the upper and lower parallel bars, means for yieldingly maintaining the coupler-frame in its normal upright position, the brace-piece rigidly connected to the lower parallel bar, and the locking-latch pivoted to the upper parallel bar and adapted to have interlocking engagement with the brace-piece, substantially as and for the purpose set forth.

6. The combination of the coupler-frame comprising the upper and lower parallel bars, the vertical end bars pivotally connected to the upper and lower parallel bars, and means for positively controlling the rocking movements of the coupler-frame, substantially as and for the purpose set forth.

7. The combination of the coupler-frame comprising the upper and lower parallel cross-bars, the vertical end bars pivotally connected to the upper and lower parallel cross-bars, the brace-piece rigidly connected to the lower parallel cross-bar, the controlling rock-shaft, and the link connection between the brace-piece and the controlling rock-shaft, substantially as set forth.

8. The combination of the flexible coupler-frame comprising the upper and lower parallel cross-bars, the vertical end bars pivotally connected to the upper and lower parallel cross-bars, means for maintaining the coupler-frame in its normal upright position, and stop devices for limiting the rocking movements of the said frame in opposite directions, substantially as set forth.

9. The combination of the coupler-frame comprising the upper and lower parallel cross-bars, the vertical end bars having pivotal connection with said parallel cross-bars, the plate spring or springs for maintaining the frame in its normal upright position, and the coiled spring connected to the upper parallel cross-bar and adapted to be detachably connected with a portion of the lower parallel cross-bar, substantially as set forth.

10. The combination of the flexible frame for coupling two bicycles, consisting of the end bars for attachment to the bicycles, the cross-bar pivotally connected at its opposite ends to the end bars, and the spring or springs connecting the end bars and the cross-bar, whereby the bicycles are yieldingly maintained in their normal upright positions, substantially as described.

11. The combination of the front or main supporting-frame comprising the upper and lower parallel cross-bars, the vertical end bars having pivotal connection with said parallel cross-bars, and the attaching devices for said end bars; the rear or auxiliary supporting-frame comprising the equalizing-spring, the side connecting-bars to which said equalizing-spring is connected, the attaching devices for said side connecting-bars, the central rod for connecting the main and auxiliary frames, and spring devices for yieldingly maintaining the frames in their normal upright position, substantially as and for the purpose set forth.

In testimony whereof I affix my signature in presence of two witnesses.

ELISHA S. KEELER.

Witnesses:
J. K. SILVARA,
W. F. WILCOX.